United States Patent Office 3,576,597
Patented Apr. 27, 1971

3,576,597
METHOD FOR THE PREPARATION OF LITHIUM SILICATE SOLUTIONS
Helmut V. Freyhold, Dusseldorf-Oberkassel, and Volker Wehle, Hilden-Rhineland, Germany, assignors to Philadelphia Quartz Company, Philadelphia, Pa.
No Drawing. Filed Sept. 27, 1967, Ser. No. 671,143
Int. Cl. C01b 33/32; B01g 11/34
U.S. Cl. 23—110                4 Claims

ABSTRACT OF THE DISCLOSURE

Clear concentrated solutions of lithium silicate having a ratio by weight greater than $4SiO_2:1Li_2O$ are prepared batchwise or continuously by preparing solutions of silica in lithium hydroxide, separating the precipitated reaction product formed at 70 to 100° C., and recovering the clear liquid which forms on cooling said precipitate.

---

The reaction of silica in lithium hydroxide solutions is peculiarly different from that in the other alkali metal hydroxide solutions. While silica may be dissolved in the strongly alkaline solutions of sodium hydroxide or potassium hydroxide, when these hydroxides are added to a silica sol of commercial concentration the silica separates and does not appear to revert to a silicate solution. On the other hand, Iler has shown that a precipitate formed at room temperature by the addition of lithium hydroxide to a silica sol reverts to a clear solution and, furthermore, Patton et al. have shown that similar compositions may be heated to about 150° C. under pressure for several hours to form lithium silicate compositions which are then cooled in a stepwise fashion over a period of hours to form clear solutions of lithium silicate. Both of these procedures are cumbersome and relatively uneconomical.

The usual method for preparing alkali metal solutions having a ratio above $2SiO_2:1Na_2O$, for example, is to form a glass by melting silica with the alkali oxide and then dissolving the glass in water. Glasses of lithium silicate are, however, practically insoluble by any known procedure.

An economical method for the manufacture of concentrated lithium silicate solutions having a weight ratio of over $4SiO_2:1Li_2O$ and generally up to about $9SiO_2:1Li_2O$ is desired because these solutions have been shown to be excellent binders for corrosion resistant zinc-rich paints.

An objective of this invention is to improve the method for the preparation of aqueous lithium silicate solutions by heating dispersions of finely divided silicic acid and lithium hydroxide. According to our invention the said dispersions at a weight ratio of from $4SiO_2:1Li_2O$ to $8.6SiO_2:Li_2O$ and a silica content of 8 to 20% based on the total mixture are heated to a temperature of about 80 to 100° C. A preferred temperature range is about 85 to 100° C. When heated to within this temperature range, a reaction product precipitates. This reaction product is separated and converted into an aqueous lithium silicate solution by cooling. This final solution has a weight ratio of from about $4SiO_2:1Li_2O$ to $8.6SiO_2:1Li_2O$. The liquid mother liquor remaining after separation of the reaction product can be recycled after adding additional lithium hydroxide and finely divided silicic acid to bring the composition back to the original strength. Thus a continuous process is easily carried out.

The finely divided silicic acid may be in the form of amorphous silica, such as is commercially available as a silica gel, preferably a hydrated silica gel, or a precipitated silica, preferably in a hydrated form, or as a silica sol. Commercial silica sols usually have a concentration of from 15 to 50% of $SiO_2$ and have a particle size of 7 millimicrons or greater. Lithium hydroxide is usually in the form of the monohydrate and contains about 53% by weight of lithium hydroxide, but any solution of lithium hydroxide providing the proper weight ratio of lithium oxide will be satisfactory.

These components are mixed with sufficient water to provide a dispersion of about 8 to 20% by weight of $SiO_2$. Actually, we prefer a concentration of from about 8.5 to 15% by weight of $SiO_2$, all calculated on the weight of the total mixture.

On slow heating, the dispersion gradually converts to a clear solution from which a solid reaction product precipitates on reaching a temperature between about 80 and 100° C. We recommend that the dispersion be stirred during this heating process. While it is possible to bring the dispersion up to the precipitating range by rapid heating, it is generally advantageous, especially at silica concentrations of less than 9.5 weight percent, to reach the upper temperature limit at about the end of the reaction and to hold it in this upper temperature range for a short period of time.

The reaction time is dependent, in part, on the concentration of silica as well as on the ratio of the $SiO_2$ to $Li_2O$ and on the temperature. In practice, the reaction time is between about 10 minutes and one hour. When the mother liquor is recycled the reaction time may be considerably shortened.

The precipitated reaction product is separated immediately and, preferably, while the solution is in the temperature range of about 80 to 100° C. The separation can, however, be carried out at somewhat lower temperatures. In such cases a portion of the precipitated material redissolves. By "immediate separation" we mean to indicate that the reaction product after it has precipitated is no longer heated. This is the desired end product in a solid water-containing form.

This solid product containing water converts to a highly concentrated liquid aqueous lithium sodium silicate solution on cooling without further treatment. Such a final product has a concentration of between 20 and 28% solids and a weight ratio of from $4SiO_2:Li_2O$ to about $8.6SiO_2:1Li_2O$.

The mother liquor remaining after separation of the precipitated solid consists of a lithium silicate solution of low concentration and may be recycled for the production of additional product after preparing new starting dispersions by the addition of the proper amounts of silica and lithium hydroxide.

This latter method of operation is always used if highly concentrated lithium silicate solutions are to be produced by a continuous process. The separation of the solid reaction product in a continuous process at the high temperature is carried out by any suitable technical means such as, for example, by using a heated centrifuge. The separation may also be carried out in heated settling tanks. The solid reaction product converts to a liquid aqueous lithium silicate solution on cooling, as we have described before. The mother liquor is mixed in the desired weight ratios with silica sol or amorphous silica and lithium hydroxide to form a fresh dispersion which is then recycled to bring about the precipitation of the reaction product as described above.

One of the major advantages of our new process is that we are able to produce lithium silicate solutions with a high concentration and at relatively high ratios of silica to $Li_2O$ in times which are considerably reduced compared to those of earlier methods. A further advantage is that the process may be carried out continuously. Lithium silicate solutions made in this way are excellent binders and paint vehicles for zinc-rich paints. Such systems are characterized by short setting times and good resistance both to water and weather.

EXAMPLE 1

263 parts by weight of a finely divided silicic acid sold by Degussa under trademark Ultrasil VM 3 and containing 87.5% by weight $SiO_2$ were mixed with 112 parts by weight of a lithium hydroxide monohydrate having 53% of $Li_2O$ in 1588 parts by weight of water using continuous stirring. This dispersion was heated within 10 minutes to about 100° C. and the mixture was held at this temperature with continued stirring for 40 minutes. The precipitate was then filtered off while hot and then allowed to cool. During the cooling period the precipitate converted to a concentrated lithium silicate solution containing 23.4% by weight of $SiO_2$ and 3.31% by weight of $Li_2O$. The mother liquor contained 9.6% of $SiO_2$ and 1.55% of $Li_2O$ and could be used for a second reaction after concentration.

EXAMPLE 2

300 parts by weight of a silica gel containing 87.5% of $SiO_2$ was mixed with 118 parts by weight of lithium hydroxide monohydrate, described in Example 1, and dispersed in 1582 parts by weight of water. This dispersion was heated for one hour at 70° C. with continuous stirring until the dispersion had become relatively clear. The mixture was then quickly heated to 100° C. and the precipitate which formed at that temperature was separated. On cooling, the precipitate converted to a concentrated lithium silicate solution having a concentration of about 23.6% by weight of $SiO_2$ and 3.49% by weight of $Li_2O$.

The mother liquor contained 9.6% of $SiO_2$ and 1.6% of $Li_2O$. 1270 parts by weight of this mother liquor was then mixed with 51 parts by weight of the lithium hydroxide monohydrate and 160 parts by weight of the same silica gel. 519 parts of water were added to this dispersion and the mixture heated to 99° C. with continuous stirring. The reaction time was 35 minutes. The precipitate which separated at 99° C. was separated with a centrifuge heated to 100° C. The precipitate was then removed from the centrifuge and cooled. During cooling it converted to a concentrated lithium silicate solution containing 21.4% by weight of $SiO_2$ and 2.88% of $Li_2O$. This corresponds to a weight ratio of 7.4 $SiO_2$ to $1Li_2O$.

EXAMPLE 3

Using the process described in Example 2 above, 300 parts by weight of finely divided silicic acid (described in Example 1) and 87 parts by weight of the lithium hydroxide monohydrate were dispersed in 1613 parts by weight of water. The reaction was carried out for 45 minutes with continued stirring using the same temperature cycle as in Example 2. The solid reaction product which separated at the higher temperature was transformed on cooling into a concentrated lithium silicate solution containing 18.7% by weight of $SiO_2$ and 2.18% by weight of $Li_2O$. This corresponds to a weight ratio of $8.6SiO_2:1Li_2O$.

EXAMPLE 4

For the continuous preparation of lithium silicate solutions, a mixture of finely divided silicic acid (described in Example 1) and lithium hydroxide monohydrate was dispersed in water in a mixing tank giving a dispersion containing 13.2% of $SiO_2$ and 1.86% of $Li_2O$, both by weight. The dispersion was then pumped through a three-phase cascade heat-exchanger with a retention time of about 15 minutes per phase at a temperature of about 98–100° C. Instead of the cascade heater, we could have used a continuous heat-exchanger. The reaction product coming from the heater was pumped into a continuous centrifuge which was also heated to 98–100° C. and the solid was separated from the liquid phase.

The solid phase was then pumped into a container and converted on cooling to a clear lithium silicate solution containing 23.3% of $SiO_2$ and 3.3% of $Li_2O$ which corresponds to a weight ratio of $7SiO_2:1Li_2O$. The mother liquor which contained 9% of $SiO_2$ and 1.25% of $Li_2O$ was recycled hot into the mixing tank and was adjusted to the original concentration by the addition of more finely divided silicic acid and lithium hydroxide monohydrate. The reaction mixture was again pumped through the heat-exchangers and the recycling was continued.

The lithium silicate solution produced by this continuous process was used as a binder for a zinc-rich paint with the usual satisfactory development of a corrosion resistant coating on steel.

What is claimed is:

1. A process for the preparation of liquid lithium silicate solutions which comprises:
    (a) forming an aqueous dispersion of finely divided silica, and lithium hydroxide, so that the weight ratio of $SiO_2:Li_2O$ is within the range of about 4:1 and 8.6:1 and the silica content based on the total mixture is 8 to 20% by weight,
    (b) heating said aqueous dispersion to a temperature within the range of about 80–100° C. until a reaction product precipitates,
    (c) separating the precipitated product from the mother liquor while the mother liquor is still at a temperature within the range of about 80–100° C.
    (d) cooling the separated precipitated product to form an aqueous lithium silicate solution having a $SiO_2:Li_2O$ ratio within the range of about 4:1 and 8.6:1 and a solids concentration of between about 20 and 28%.

2. A process according to claim 1 wherein the separated mother liquor is recycled to step (a) together with enough additional lithium hydroxide and finely divided silica to bring the recycled mother liquor to the $SiO_2:Li_2O$ weight ratio and the silica content that is set forth in step (a).

3. A process according to claim 1 wherein the finely divided silica is selected from the group consisting of silicic acid, amorphous silica, silica gel, precipitated silica, and silica sol.

4. A process according to claim 2 wherein the finely divided silica is selected from the group consisting of silicic acid, amorphous silica, silica gel, precipitated silica, and silica sol.

References Cited

UNITED STATES PATENTS 1,959,448    5/1934    Staufer et al. _____ 23—110

FOREIGN PATENTS 1,051,621    12/1966    Great Britain _____ 23—113

OTHER REFERENCES

Chemical Abstracts, vol. 55, page 24345i (1961).

OSCAR R. VERTIZ, Primary Examiner

H. S. MILLER, Assistant Examiner

U.S. Cl. X.R.

252—313